Nov. 17, 1959    C. R. GALLAMOS    2,913,566
AUTOMATIC EGG HARD- AND SOFT-BOILER AND WATER HEATER
Filed May 23, 1958    3 Sheets-Sheet 1
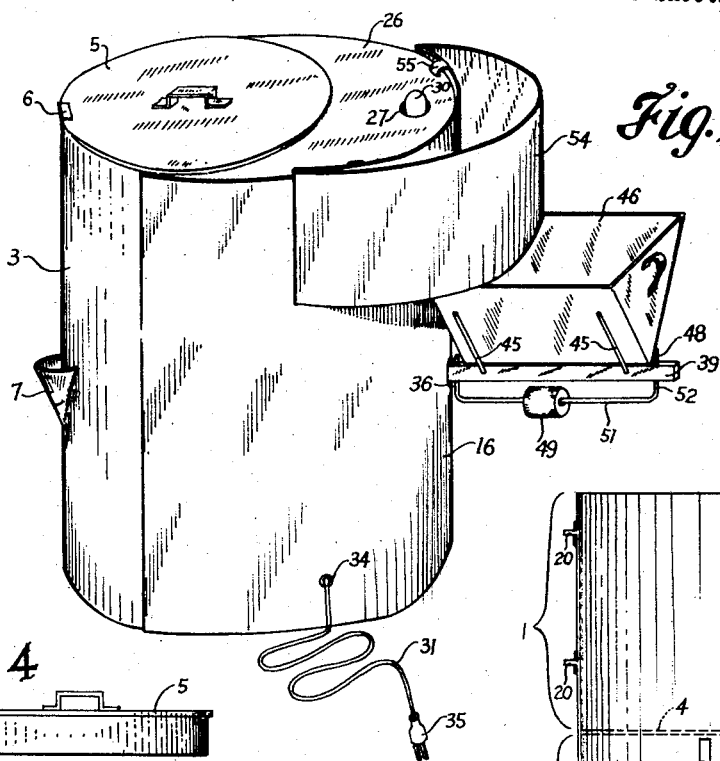
Fig.1
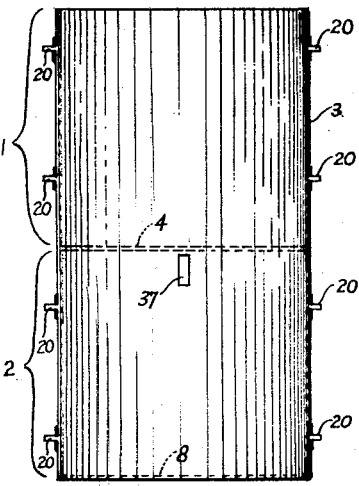
Fig.4
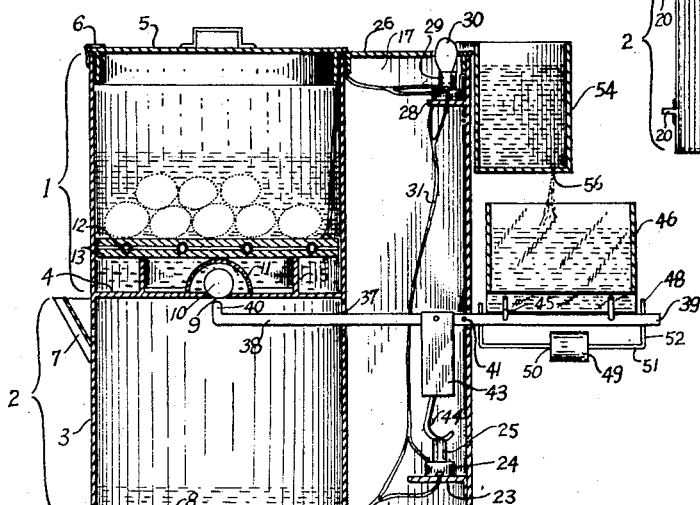
Fig.3
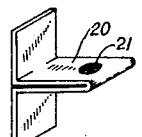
Fig.8
Fig.2
CONSTANCIO R. GALLAMOS
INVENTOR Nov. 17, 1959  C. R. GALLAMOS  2,913,566
AUTOMATIC EGG HARD- AND SOFT-BOILER AND WATER HEATER
Filed May 23, 1958  3 Sheets-Sheet 2
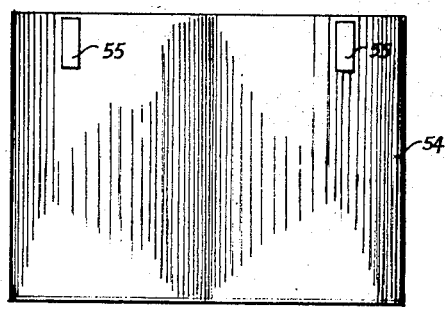
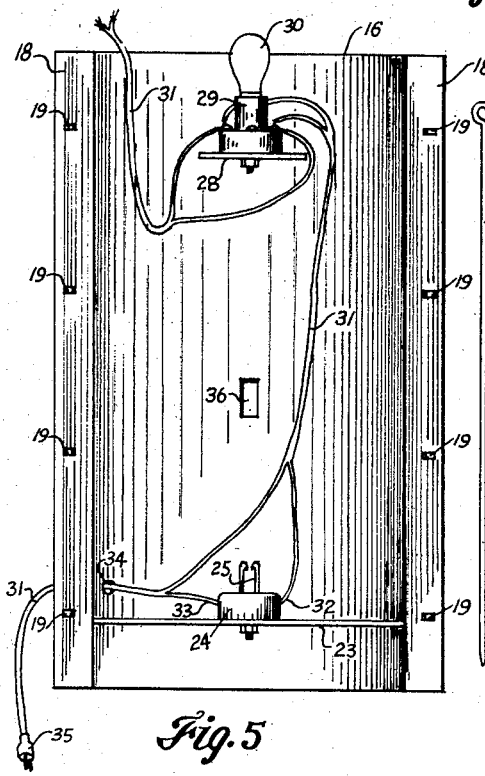
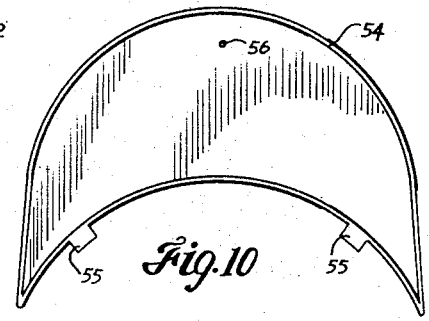
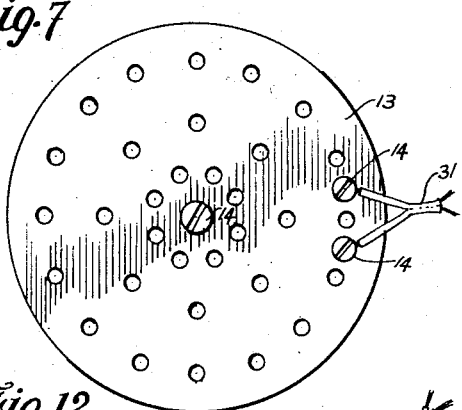
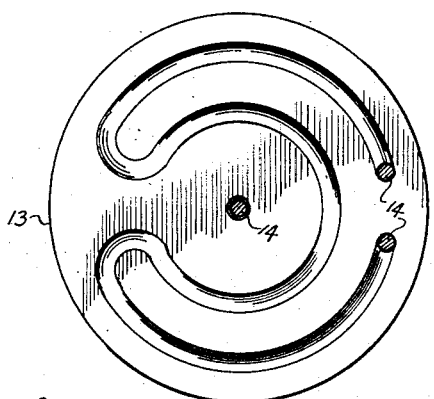
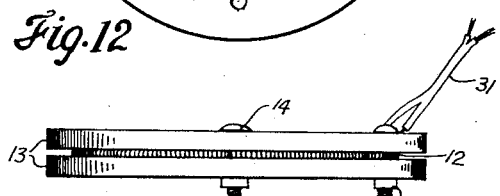
CONSTANCIO R. GALLAMOS
INVENTOR Nov. 17, 1959  C. R. GALLAMOS  2,913,566
AUTOMATIC EGG HARD- AND SOFT-BOILER AND WATER HEATER
Filed May 23, 1958  3 Sheets-Sheet 3
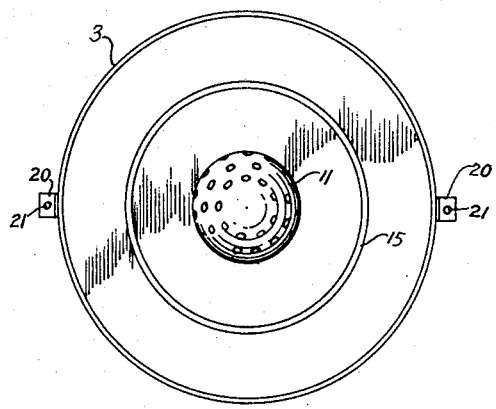
Fig. 17
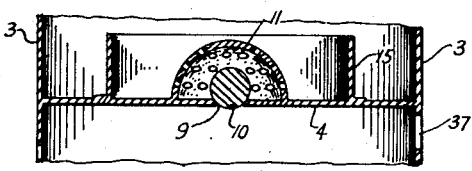
Fig. 18
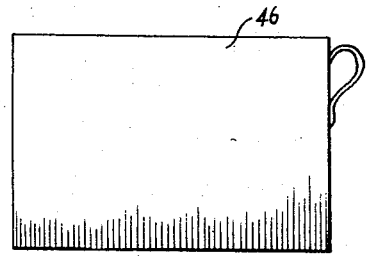
Fig. 15
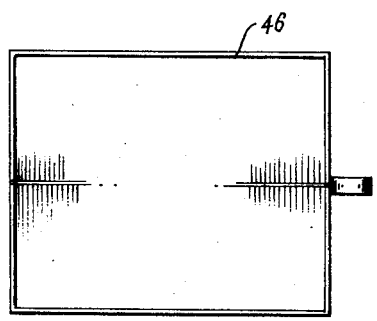
Fig. 16
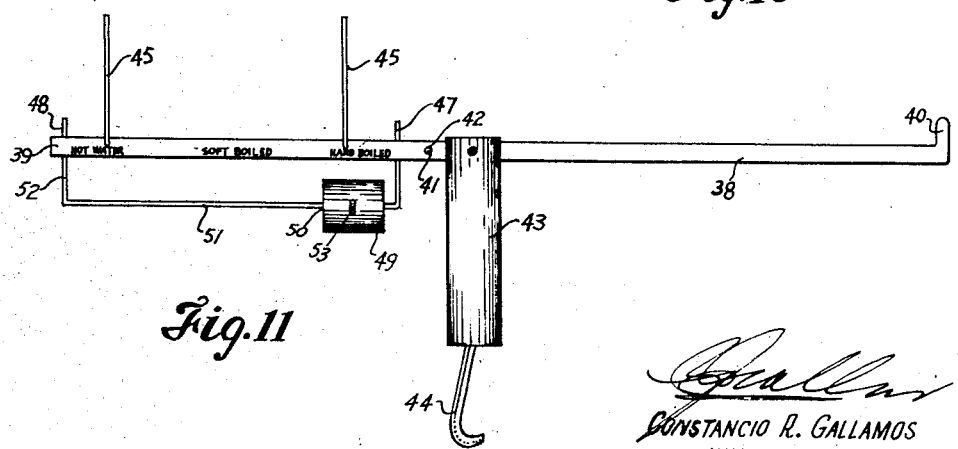
Fig. 11
CONSTANCIO R. GALLAMOS
INVENTOR United States Patent Office 2,913,566
Patented Nov. 17, 1959

2,913,566

AUTOMATIC EGG HARD- AND SOFT-BOILER AND WATER HEATER

Constancio R. Gallamos, Manila, Republic of the Philippines

Application May 23, 1958, Serial No. 737,450

6 Claims. (Cl. 219—38)

This invention relates to a device which will hard-boil or soft-boil eggs perfectly and without any chance of the eggs becoming either under-cooked or hard-boiled where they are intended to be soft-boiled, or soft-boiled or over-cooked where they are intended to be hard-boiled, even without their being watched or attended to since after a certain length of time as determined by the kind of cooking desired of the eggs, the device automatically: (1) stops functioning, and (2) separates the cooked eggs from the boiling water. The device will also heat water up to the boiling point after which it automatically stops functioning.

The matter of soft-boiling or hard-boiling eggs exactly has always been a problem to busy housewives and cooks in homes and in public eating places as well as in various other kinds of establishments wherein the cooking of eggs regularly is a necessity. Every too often housewives and cooks discover to their dismay, and always too late, of course, that the eggs they wanted to soft-boil had either become hard-boiled or had been prematurely served, and that the eggs they wanted to hard-boil had become either over-cooked or were only soft-boiled when served or used. Complete loss of the eggs results when they are over-cooked to such extent that they become malodorous. On top of this, over-cooked hard-boiled eggs pose a danger to health and life as it has been reported that such kind of eggs are poisonous. Failure to obtain the desired result while cooking eggs can only be attributed to any, or a combination of, the following causes: (1) lack of knowledge on the part of the person cooking the eggs as to the length of time it takes for an egg to become either soft-boiled or hard-boiled, (2) miscalculation as to length of time, (3) on account of the eggs having been forgotten, and (4) inability on the part of the person cooking the eggs to remove the same from the boiling water at the proper time by reason of his or her having to attend to something else which he or she could not possibly disregard at the moment.

The primary object of this invention is to provide a device of the aforementioned character which will solve, once and for all, the problem of soft-boiling or hard-boiling eggs perfectly without having to attend to and watch the eggs while they are cooking.

Another object of this invention is to provide a device which will insure the perfect cooking of soft-boiled or hard-boiled eggs even by those who have no idea at all as to how long it takes for an egg to become exactly soft-boiled or hard-boiled.

A further object of this invention is to provide a device of the aforementioned character which will boil water in a couple of minutes and then automatically stop functioning the moment the boiling point of the water has been reached.

Still another object of this invention is to provide a device which will hard-boil or soft-boil eggs in a relatively short time by the use of electricity.

A final object of this invention is to provide a device which will considerably reduce the cost of cooking eggs or simply boiling water since the device automatically stops functioning the moment the desired result has been accomplished.

With the above objects and advantages in view, together with others which will come to light in the course of the description, the present invention consists in the novel construction, arrangement and combination of parts, as are described more fully and specifically hereinafter.

In the accompanying drawings which form part of the specification:

Figure 1 is a perspective view of the complete invention.

Figure 2 is a vertical sectional view of the complete invention.

Figure 3 is a rear elevational view of the upper and lower receptacles.

Figure 4 is an elevational view of the cover of the upper receptacle.

Figure 5 is an elevational view of the compartment adjoining the upper and lower receptacles as shown in Figure 2.

Figure 6 is an elevational view of the cover of the compartment adjoining the upper and lower receptacles.

Figure 7 is an elevational view of the pintle used to lock into place the detachable sheet as shown in Figure 5.

Figure 8 is a perspective view of the anchor strips.

Figure 9 is an elevational view of the receptacle which is detachably attached to the outer side of the uppermost rim of the exterior side of the compartment adjoining the upper and lower receptacles.

Figure 10 is a top view of the receptacle referred to in the next preceding paragraph.

Figure 11 is a side elevation view of the rod forming the balance.

Figure 12 is a top view of the circular asbestos cement sheets which sandwich the Nichrome wire.

Figure 13 is a sectional top view through line 13—13 of Figure 14.

Figure 14 is an elevational view showing the two asbestos cement sheets and the Nichrome wire.

Figure 15 is an elevational view of the V-shaped cup or receptacle.

Figure 16 is a top view of the V-shaped cup or receptacle.

Figure 17 is a top view at section 17 in Figure 3.

Figure 18 is a sectional elevation view at Figure 17.

Referring to the drawing, 1 indicates an upper receptacle on top another identical receptacle 2, both of which compartments are formed by a single sheet of plain galvanized iron or any other suitable material 3, a bottom 4 of upper compartment or receptacle 1 which is soldered or other wise permanently attached horizontally to the interior face of sheet 3 at a point a little above midway between the uppermost and the lowermost edges of said sheet 3, an outlet 7 and a bottom 8 of lower compartment 2. A cover 5 of the upper receptacle 1 is attached with a hinge 6 to the uppermost rim of said upper receptacle. At the center of the bottom 4 is a perfectly circular opening 9 with a diameter slightly shorter than the diameter of an ordinary marble commonly used by children as a plaything and in playing the game of "Hole-In." A perfectly rounded ordinary marble 10 as referred to in the next preceding sentence, or any other suitable material which will serve the purpose, is placed on the opening 9 for the purpose of plugging the same. A protective dome-shaped covering 11 which has perforations all over to allow free passage of water is permanently placed over the marble 10 and the opening 9 in such a manner as to allow said marble 10 to be pushed up freely from below and yet insure its plugging again securely the opening 9 the moment pressure from below is removed.

An ordinary length of Nichrome wire 12 which can withstand electric current of 220 volts when submerged in water is properly secured and sandwiched between two identical circular asbestos cement sheets 13, or any other suitable non-electrical-conductor, fire-resistant material, both of which sheets 13 having perforations all over to allow free passage of water. The two asbestos cement sheets 13 are securely held together by means of a suitable bolt and nut 14 which is free from contact with the Nichrome wire 12. This combination of the Nichrome wire 12 and the two asbestos cement sheets 13 is securely attached to a base 15 which is made of a hollow or bottomless cylinder which is of the same height as the protective dome-shaped covering 11, and which is secured permanently to the central part of the bottom 4 of upper compartment 1, as illustrated in Fig. 18.

16 indicates the exterior side or sheet of a compartment 17 which is formed by one side of sheet 3 forming the upper and lower compartments or receptacles 1 and 2, and said sheet 16. Said sheet 16 is securely but detachably attached to the side of sheet 3 by means of the inwardly curved flanges 18 (Fig. 5) of said sheet 16, each of which said flanges 18 having a plurality of horizontal slits 19 at suitable places through which are passed, in the process of attaching sheet 16 to sheet 3, the free portions of a similar number of anchor strips 20 which are permanently attached to the side of sheet 3 and horizontally extending such that they all fit into the corresponding horizontal slits 19 found on the inwardly curved flanges 18 of side 16. Each of said anchor strips 20 which are arranged so as to form a couple of perpendicular columns on the exterior side of sheet 3 and which correspond to the inwardly curved flanges 18, bear a circular hole 21 through which is downwardly passed a pintle 22 (Fig. 7) after each of said anchor strips 20 has been passed through the corresponding slits 19. In this manner, sheet 16 is securely but detachably attached to sheet 3.

Compartment 17 has itself a bottom 23 to which is securely attached a base 24 for a pair of confronting suitable electrical-conductor metal pegs 25. Said compartment 17 has likewise a suitable cover 26 which has a circular opening 27 as shown in Fig. 2. At a suitable location on the upper portion of the interior face of sheet 16 is horizontally permanently attached a suitable base 28 for an electric bulb receptacle 29 which is suitably attached to said base 28. A small electric bulb 30 with the lowest wattage is properly screwed into said receptacle 29 such that the glass tip of said electric bulb 30 passes through circular opening 27 and can be seen from the side when viewed at the same level as the cover 26.

The Nichrome wire 12 which is securely sandwiched between the two asbestos cement sheets 13 is properly connected electrically to an electrical extension cord 31 (Fig. 13), i.e., one end of said Nichrome wire is connected to the positive wire and the other end to the negative wire of the extension cord 31. Said extension cord 31 extends up to the rim of the upper receptacle 1 and then down into the compartment 17 (Fig. 2). The twin electric wires of extension cord 31 are then electrically connected to the electric bulb receptacle 29 by connecting one wire to one electrical-conductor screw and the other wire to the other electrical-conductor screw. The free portion of extension cord 31 is then brought down to the bottom 23 of compartment 17. One of the pair of electrical wires composing the extension cord 31, or, say, the positive wire, is cut or severed completely, the cut ends being designated in the drawing as 32 and 33 (Fig. 5). Wire end 32 is electrically connected to one of the pair of electrical-conductor metal pegs 25 and wire end 33 is likewise electrically connected to the other electrical-conductor metal peg 25. Therefore, a gap or break in the continuity of the electric circuit when the electric current is turned on exists at the point between the two confronting identical electrical-conductor metal pegs 25. In other words, even if the electric current is turned on, the Nichrome wire 12 will not burn unless an electrical conductor is made to fill the gap or hiatus between the two confronting metal pegs 25 which are connected one to electrical wire end 32 and the other to electrical wire end 33.

The free end of electrical extension cord 31 is then passed through a suitable opening 34 at the side of the lowermost portion of sheet 16 (Fig. 1). An ordinary electrical plug 35 is electrically connected to the free tip of electrical extension cord 31.

Equidistant from the vertical edges of the sheet 16 and at a point just a little below the level of bottom 4 is an I-shaped opening 36. A similar but considerably longer I-shaped opening 37 is made on sheet 3 at a point immediately opposite I-shaped opening 36. Through these two I-shaped openings 36 and 37 is passed into compartment 2 one end of a rod 38 which may be made of metal or any other suitable material the end 40 of which is curved or deflected upwardly and vertically. A small cylindrical metal rod or pin 41 (Fig. 5) of suitable length is passed through a suitable hole 42 drilled through rod 38. The ends of said metal pin 41 are then soldered or otherwise permanently attached horizontally to the interior side of the opposite perpendicular edges of the I-shaped opening 36 such that the upwardly pointing tip 40 of rod 38 is immediately below the marble 10 and circular opening 9 located at the center of bottom 4.

One end of a non-electrical-conductor rod 43 is attached permanently to the under-side of rod 38 at a point which is midway, more or less, between the two I-shaped openings 36 and 37, or within the compartment 17. The position of rod 43 is therefore perpendicular. One end of a curved electrical-conductor metal rod 44 is permanently attached to the lower endmost tip of non-electrical-conductor rod 43 such that the free end of said electrical-conductor metal rod 44 is, when the lever or rod 38 is at a balanced position, but a few millimeters directly above the pair of confronting electrical-conductor metal pegs 25 the tips of which are curved towards each other.

The portion of rod 38 which is outside the compartment 17 serves as a base 39 for a couple of V-formed upstanding supports 45 which are permanently attached to said base 39 with said pair of V-formed upstanding supports 45 facing each other as illustrated in Fig. 11. A light suitable V-shaped cup 66 is placed into the V-formed upstanding supports 45 (Fig. 1). A peg 47 of suitable length is permanently and perpendicularly attached to the upper side of base 39 at a point a few millimeters away from the I-shaped opening 36 such that said upstanding peg 47 prevents the V-shaped cup 46 from having contact with sheet 16 at all times.

Another peg 48 which is identical to peg 47 is similarly permanently and perpendicularly attached to the tip of base 39 such that V-shaped cup 46 is assured a permanent and stable location whenever placed into the V-formed upstanding supports 45.

A cylindrical weight 49 which may be made of lead or metal (Fig. 11) bears a hole 50 (Fig. 2) drilled straight from off the center of one tip through the entire length of said cylindrical weight 49 and coming out at an identical position at the other tip of said weight 49. A strong metal rod or wire 51 of suitable length is passed through the hole 50, and its opposite ends 52 are then bent upwardly and vertically and then permanently attached to the underside of the base 39 in such a manner that the cylindrical weight 49 can be freely and smoothly slid from the left to the right, and vice versa, the same weight maintaining a permanent bottom or lower portion by reason of the location of the hole 50 which was drilled off the longitudinal center or core of said sliding weight 49. A peg or knob 53 of suitable size extends horizontally from the center of each longitudinal side of the sliding weight 49 the purpose of which is to serve as handle when sliding or adjusting the location of said sliding weight 49. At each plain longitudinal vertical side of base 39 and within the line embraced by the upwardly bent ends 52 of metal rod or wire 51, are inscribed the following words: "Hard-Boiled" at a point nearest to the I-shaped opening 36 on side 16; "Hot Water" at a point farthest from the I-shaped opening 36 on side 16; and "Soft-Boiled" midway or so between the words "Hard-Boiled" and "Hot Water." Thus, if the user of the device desires to hard-boil the eggs, he or she should slide the weight 49 such that it is located immediately below the inscribed words "Hard-Boiled," if the eggs desired are soft-boiled, the sliding weight 49 should be located immediately below the inscribed words "Soft-Boiled," and if it is only desired to heat water, then the sliding weight 49 should be directly below the inscribed words "Hot Water."

A receptacle 54 is detachably attached to a permanent location on the uppermost rim of side 16 (Fig. 1) just above the V-shaped cup or receptacle 46 by means of a pair of prongs 55 permanently attached to the shorter curved side of said receptacle 54 (Figs. 9 and 10) and bent downwards and closely to the side of the latter such that said prongs could be slipped into the upper rim of side 16, thus securely but detachably attaching said receptacle 54 to said side 16 and immediately above the V-shaped cup 46. At the bottom of receptacle 54 is drilled a tiny hole 56 (Fig. 10) with a drill bit. Thus, whenever said receptacle 54, the proper location of which is immediately above V-shaped receptacle 46, is filled with water entirely free from any particle which may clog tiny hole 56, the water falls or drips slowly through said tiny hole 56 right into V-shaped receptacle 46. In this manner, V-shaped receptacle 46 slowly acquires more and more weight with each drop of water falling into it from the receptacle 54.

From the above description, it can be clearly seen that a lever or balance has been formed, with the fulcrum being located at the small cylindrical metal rod or pin 41 which has been passed through hole 42 on rod 38 and the ends of which have been soldered horizontally to the vertical sides of I-shaped opening 36 on side 16. One side of the balance consists of the following: the portion of rod 38 from its hole 42 up to and including its upwardly curved end 40, together with the non-electrical-conductor rod 43 vertically attached permanently to the under-side of rod 38, and also the curved electrical-conductor metal rod 44 one end of which is permanently attached to the lower endmost tip of said rod 43. The other side of the balance is comprised of the following: the much shorter portion of rod 38 located outside the compartments 2 and 17, and designated in the drawing as 39, the upstanding V-formed supports 45, the upstanding pegs 47 and 48, the cylindrical metal weight 49 together with the metal rod or wire 51 which is passed through the hole 50 of said metal weight 49 and the upwardly curved ends of which are permanently attached to the under-side of 39, and finally, the V-shaped receptacle 46. It is, therefore, clear that one side of the balance is concealed inside the compartments 2 and 17, and the other side is exposed. So that, henceforth, for the sake of facility in the description, one side of the balance shall be referred to as the "concealed" side and the other as the "exposed" side.

When the V-shaped receptacle 46 is empty, the concealed side of the balance is considerably heavier than its exposed side. So that, at this stage, the balance is tipped to its concealed side, and the electrical-conductor metal rod 44 is invariably in contact with both of the pair of confronting electrical-conductor metal pegs 25, thus allowing the continuity of the electric current to run through the whole circuit when the electric current is turned on. In this manner, the Nichrome wire 12 is allowed to function or to burn, so much so that, when submerged in water, said burning Nichrome wire 12 necessarily boils the water, thus cooking the egg or eggs. Therefore, the moment the exposed side of the balance gains sufficient weight so as to overcome the weight of the concealed side of the balance, electrical-conductor metal rod 44 is immediately lifted from contact with the pair of confronting electrical-conductor metal pegs 25, thus inevitably stopping the flow of the electric fluid, so that the Nichrome wire naturally stops functioning or burning. Almost simultaneously with the lifting of the electrical-conductor metal rod 44 from contact with the pair of confronting electrical-conductor metal pegs 25, the upwardly curved end 40 of rod 38 pushes up the marble 10 plugging the circular opening 9 on bottom 4, thus allowing the boiling water in compartment 1 to rush or fall down into compartment 2. In this manner, the eggs being cooked become freed from contact with the boiling water, and therefore, they are prevented from being cooked any further.

The gradual acquisition by the exposed side of the balance of weight sufficient to overcome the weight of the concealed side of the balance is made possible by the water passing or falling down through tiny hole 56 at the bottom of receptacle 54, which said water is caught by V-shaped receptacle 46.

The following weights and measurements and their respective relationships towards each other are given merely for the purpose of illustration and never with the intention of limiting the construction of my invention to said weights and measurements since the workability of the principle involved in the tipping of the balance towards its exposed side depends merely upon getting the right combination of the proper location of the sliding weight 49 and the volume of water that may have fallen into V-shaped receptacle 46 after the lapse of a certain number of minutes which is determined by the nature of service desired, that is, whether the eggs desired are soft-boiled or hard-boiled or simply hot water is desired. The tiny hole 56 at the bottom of receptacle 54 was made with a drill bit with a diameter not exceeding one millimeter. When receptacle 54 is filled with water that is entirely free from any particle which may clog the tiny hole 56, water passes down into receptacle 46 such that the exposed side of the balance acquires weight sufficient to tip the balance to its side in the following number of minutes: two minutes if the sliding weight 49 is placed immediately below the words "Hot Water" inscribed at the side of base 39, four minutes if sliding weight 49 is placed immediately below the words "Soft-Boiled," and eight minutes if sliding weight 49 is placed immediately below the inscribed words "Hard-Boiled." In other words, if the sliding weight 49 is placed immediately below the inscribed words "Hot Water" which are located farthest from the fulcrum, it requires only approximately two minutes (the time required to boil 65 ounces, more or less, of water by the use of my invention) within which to tip the balance to its exposed side, and when this happens, as has already been explained above, the electrical-conductor metal rod 44 which is attached to the lower endmost tip of insulator rod 43 is necessarily lifted from contact with the pair of confronting electrical-conductor metal pegs 25, thus stopping the flow of electric current to the Nichrome wire 12, which, of course, has to stop burning. Similarly, if the sliding weight 49 is located immediately below the inscribed words "Soft-Boiled," it requires only approximately four minutes (the time required to soft-boil eggs by the use of the present invention) within which to tip the balance to its exposed side, and when the sliding weight 49 is located immediately below the inscribed words "Hard-Boiled" it requires approximately eight minutes (the time required to hard-boil eggs with the present device) within which to tip the balance to its exposed side.

Having thus described my invention fully and in detail, I now present my claims which I desire to be protected by Letters Patent as follows:

1. An automatic egg hard- and soft-boiler and water heater, two identical receptacles, one on top the other and the two being permanently joined together, the lower receptacle being of slightly greater capacity than the other and the same being provided with an outlet at its upper portion, and at the center of the bottom of the upper receptacle of which is a perfectly circular opening leading directly into the lower receptacle, a perfectly rounded means being provided for the effective plugging of said opening such that water that may be poured into said upper receptacle would be prevented from falling down into the lower receptacle, a perforated dome-shaped covering permanently attached over the perfectly circular opening and the perfectly rounded means for plugging said opening in such a manner that the means for plugging the opening can be pushed up freely from below and yet insure its plugging again securely said circular opening the moment pressure from below is removed.

2. An automatic egg hard- and soft-boiler and water heater, two identical receptacles, one on top the other and the two being permanently joined together, and at the center of the bottom of the upper receptacle of which is a perfectly circular opening leading directly into the lower receptacle, means being provided for the effective plugging of said opening, a perforated dome-shaped covering permanently attached over the perfectly circular opening and the perfectly rounded means for plugging said opening, a hollow or bottomless cylindrical base permanently attached to the central part of the bottom of the upper receptacle in such a manner that the perforated dome-shaped covering is situated at the center of said hollow cylindrical base, an electrically connected ordinary length of Nichrome wire which can function properly or withstand electric current when submerged in water, said Nichrome wire being secured and sandwiched between two identical circular sheets of electrical-insulator, fire-resistant material, said combination of Nichrome wire and electrical-insulator, fire-resistant sheets being securely attached horizontally to the top of the hollow or bottomless cylindrical base permanently attached to the central part of the bottom of the upper receptacle.

3. An automatic egg hard- and soft-boiler and water heater, two identical receptacles, one on top the other and the two being permanently joined together, at the center of the bottom of the upper receptacle of which is a perfectly circular opening leading directly into the lower receptacle, means being provided for the effective plugging of said opening such that water that may be poured into said upper receptacle would be prevented from falling down into the lower receptacle, a perforated dome-shaped covering permanently attached over the perfectly circular opening and the perfectly rounded means for plugging said opening in such a manner that the means for plugging the opening can be pushed up freely from below and yet insure its plugging again securely said circular opening the moment pressure from below is removed, a compartment adjoining one side of the upper and lower receptacles, said compartment being formed by one side of the upper and lower receptacles and a sheet which is securely but detachably attached to said side of the upper and lower receptacles by means of the inwardly curved perpendicular flanges of said sheet, each of which said flanges having a plurality of horizontal slits at suitable places through which are passed, in the process of attaching said sheet to the side of the upper and lower receptacles, the free and horizontally extending portions of a similar number of anchor strips which are permanently attached to the exterior side of the upper and lower receptacles and arranged in a couple of vertical columns corresponding to the flanges referred to above, each of which said horizontally extending portions of the anchor strips bearing a circular opening through each of which is downwardly passed a pintle after each of said strips has been passed through the corresponding slit on the flanges, said compartment being provided with a bottom to which is securely attached an appropriate base for a pair of confronting but entirely separated electrical-conductor metal pegs.

4. An automatic egg hard- and soft-boiler and water heater, two identical receptacles, one on top the other and the two being permanently joined together, at the center of the bottom of the upper receptacle of which is a perfectly circular opening leading directly into the lower receptacle, means being provided for the effective plugging of said opening such that water that may be poured into said upper receptacle would be prevented from falling down into the lower receptacle, an appropriate rod with one of its ends being curved or deflected angularly, said rod being passed, with the deflected end first, through appropriate openings made first on the sheet forming the outer side of the compartment adjoining the upper and lower receptacles and finally on the upper portion of the lower receptacle at a point directly opposite the first opening, said rod serving as the lever of a balance, an appropriate hole having been drilled through it and through which said hole an appropriate metal rod or pin is passed so as to serve as the fulcrum, the ends of which said metal rod or pin are permanently horizontally attached to the perpendicular sides of the opening on the sheet forming the outer side of the compartment adjacent to the upper and lower receptacles, such that the deflected end of said rod or lever is upwardly extending and its tip being located immediately below the circular opening on the bottom of the upper receptacle.

5. An automatic egg hard- and soft-boiler and water heater, two identical receptacles, one on top the other and the two being permanently joined together, a compartment adjoining one side of the two identical receptacles, a lever or balance one side of which is within the confines of the lower receptacle and the compartment adjoining the upper and lower receptacles, and the other side being exposed, an electrical-insulator rod one tip of which is permanently attached to the under-side of the rod serving as the lever and at a point midway or so between the openings on the upper portion of the lower receptacle and on the sheet forming the outer side of the compartment adjoining the upper and lower receptacles, an electrical-conductor metal rod one end of which being permanently attached to the lower or free tip of said electrical-insulator rod in such a manner that when the lever or balance is tipped to its side which is within the confines of the lower receptacle and the compartment adjoining the upper and lower receptacles, said electrical-conductor metal rod invariably gets in contact with the two confronting electrically connected electrical-conductor metal pegs on a base securely attached to the bottom of the compartment adjoining the upper and lower receptacles.

6. An automatic egg hard- and soft-boiler and water heater, two identical receptacles, one on top the other and the two being permanently joined together, a compartment adjoining one side of the two identical receptacles, another receptacle which is considerably smaller than any of the two identical receptacles and having a tiny hole at its bottom, said receptacle being detachably attached to a permanent location on the uppermost rim of the outer side of the compartment adjoining the upper and lower receptacles such that its tiny hole at its bottom is directly above the mouth of the receptacle which is supported or held by the upstanding supports permanently attached to the upper side of the exposed portion of the lever or balance, which latter receptacle having a capacity similar to the capacity of the other receptacle directly above it.

References Cited in the file of this patent
UNITED STATES PATENTS

| | | |
|---|---|---|
| 670,296 | Richardson | Mar. 19, 1901 |
| 1,051,991 | Fine et al. | Feb. 14, 1913 |
| 1,297,180 | Kilbourne | Mar. 11, 1919 |
| 1,387,357 | Corbett | Aug. 9, 1921 |
| 2,511,347 | Kinney | June 13, 1950 |